US010187295B2

(12) United States Patent
Carney

(10) Patent No.: US 10,187,295 B2
(45) Date of Patent: Jan. 22, 2019

(54) SYSTEMS AND METHODS FOR ROUTING COMMUNICATIONS WITHIN GLOBAL PAYMENT NETWORKS

(71) Applicant: MASTERCARD INTERNATIONAL INCORPORATED, Purchase, NY (US)

(72) Inventor: Kevin S. Carney, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 181 days.

(21) Appl. No.: 15/150,850

(22) Filed: May 10, 2016

(65) Prior Publication Data

US 2017/0331724 A1  Nov. 16, 2017

(51) Int. Cl.
| | |
|---|---|
| G06F 15/173 | (2006.01) |
| H04L 12/707 | (2013.01) |
| H04L 12/723 | (2013.01) |
| H04L 12/741 | (2013.01) |
| H04L 12/911 | (2013.01) |
| H04L 12/751 | (2013.01) |
| H04L 12/715 | (2013.01) |
| H04L 12/721 | (2013.01) |
| H04L 12/46 | (2006.01) |

(52) U.S. Cl.
CPC .............. *H04L 45/22* (2013.01); *H04L 45/02* (2013.01); *H04L 45/04* (2013.01); *H04L 45/12* (2013.01); *H04L 45/24* (2013.01); *H04L 45/50* (2013.01); *H04L 45/745* (2013.01); *H04L 47/825* (2013.01); *H04L 12/4633* (2013.01)

(58) Field of Classification Search
CPC ......... H04L 45/22; H04L 45/24; H04L 45/50; H04L 47/825; H04L 45/745; H04L 45/02; H04L 45/04; H04L 45/12; H04L 12/4633

USPC ......................................................... 709/239
See application file for complete search history.

(56) References Cited

U.S. PATENT DOCUMENTS

| | | | | |
|---|---|---|---|---|
| 2002/0141343 A1* | 10/2002 | Bays | ................... | H04L 41/0893 370/235 |
| 2004/0090955 A1* | 5/2004 | Berthaud | ................ | H04L 45/00 370/386 |
| 2013/0163600 A1* | 6/2013 | Aguilar | ................... | G06Q 20/16 370/395.5 |

OTHER PUBLICATIONS

Traina, P., McPherson, D., and J. Scudder, "Autonomous System Confederations for BGP", RFC 5065, DOI 10.17487/RFC5065, Aug. 2007, <https://www.rfc-editor.org/info/rfc5065>. (Year: 2007).*

(Continued)

*Primary Examiner* — Taylor A Elfervig
(74) *Attorney, Agent, or Firm* — Harness, Dickey & Pierce, P.L.C.

(57) ABSTRACT

Exemplary payment networks and methods are provided for facilitating data transfers. One exemplary method includes determining a subset of network routers that offer access to a regional hub based on network address summaries for first and second routers and prioritizing the first router over the second router, based on a specificity value of each of the first and second routers, as defined by the network address summaries. The method also includes checking whether a connection to the first router provides a viable data transfer path to the regional hub and recording the path to the first router in a routing table, when the connection to the first router is viable. Further, the method includes receiving a request to transfer data to the regional hub and transferring the data, via the path recorded in the routing table, to the regional hub.

11 Claims, 3 Drawing Sheets

(56) References Cited

OTHER PUBLICATIONS

Lixin Gao, "On inferring autonomous system relationships in the Internet," in IEEE/ACM Transactions on Networking, vol. 9, No. 6, pp. 733-745, Dec. 2001. (Year: 2001).*
Riaanovski: "BGP peering multiple ISP AS prepend—Ubiquiti Networks Community", Aug. 9, 2015; 1 pg.
Caesar M et al: "BGP routing policies in ISP networks"; Nov. 1, 2005; 7 pgs.
Chang R K C et al: "Inbound traffic engineering for multihomed ASs using AS path prepending", Mar. 1, 2005; 8 pgs.

* cited by examiner

SYSTEMS AND METHODS FOR ROUTING COMMUNICATIONS WITHIN GLOBAL PAYMENT NETWORKS

FIELD

The present disclosure generally relates to payment networks and methods for facilitating the transfer of data within the payment networks, and in particular, to facilitating efficient routing of data between different available data paths according to a priority.

BACKGROUND

This section provides background information related to the present disclosure which is not necessarily prior art.

A variety of data transfers occur within a payment network to permit the authorization, clearing, and settlement of payment account transactions among issuers and/or acquirers to the transactions. In addition, the payment network is embodied to provide services between hubs and branches that make up the payment network, and to customers, partners, etc. In general, the payment network operates to provide access throughout the network to network services while permitting the secure movement and storage of data pertaining to payment network activity within the payment network. The payment network often includes multiple redundant locations of data (e.g., data centers, etc.) with multiple paths between the hubs and branches and the data centers, in order to, at least in some instances, provide backup data transfers when certain of the paths are broken or fail to satisfy minimum quality requirements.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment networks include hubs and branches and provide data transfer services and other services between the hubs and branches via networks (e.g., the Internet, other private networks, etc.). The transfer services are often provided to facilitate different services to customers and/or partners associated with the payment network. In doing so, the payment network seeks to provide efficient routing of data transferred pursuant to these services to achieve criteria related to quality of service, customer requirements, cost, etc. The payment networks and methods herein provide network traffic routing between multiple paths (or routes), supported by multiple networks disposed between global hubs, regional hubs, and regional branches, so that traffic is shifted between different paths to a preferred path. In particular, routers maintain routing tables including information (e.g. IP address ranges, specificity values, prepend values, etc.) about routers on redundant primary and secondary networks, upon which data is transferred. By adjusting prepend values and/or assigning particular addressing (different than conventionally assigned), a routing engine is able to promote certain paths over other paths. In this manner, the network is able to maintain multiple possible paths and to rely on conventional routing information (modified as describe herein), thereby selecting a preferred path based on the routing information within the network.

Figure 1:
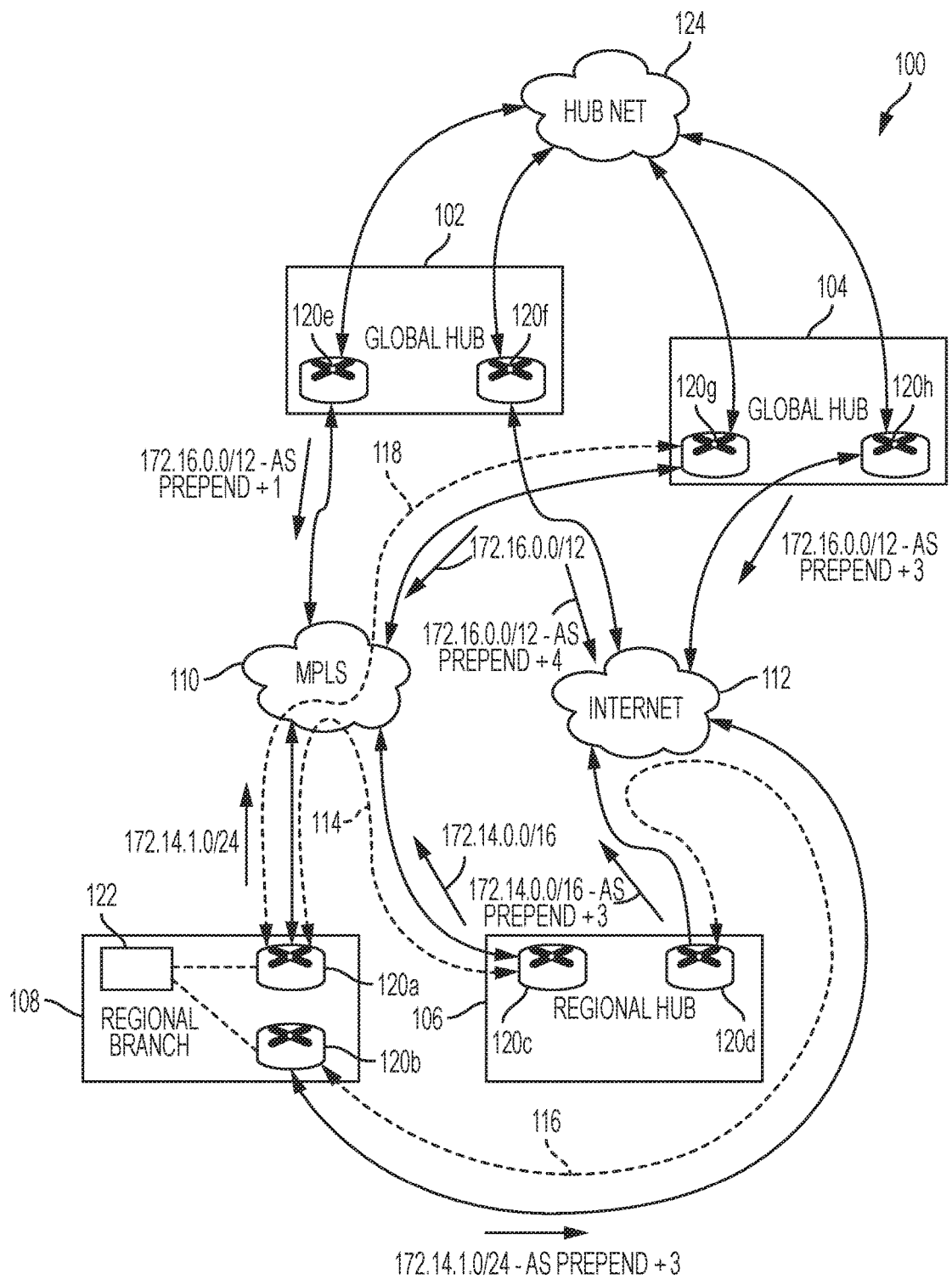
FIG. 1 is a block diagram of an exemplary payment network of the present disclosure suitable for use in routing transfers of data between regional branches, regional hubs, and global hubs forming at least part of the payment network.

FIG. 1 illustrates an exemplary network 100, in which the one or more aspects of the present disclosure may be implemented. Although parts of the network 100 are presented in one arrangement, other embodiments may include the same or different parts arranged otherwise, depending, for example, on the types and/or priorities of applications within the network 100, or data accessed thereby, etc.

In the exemplary embodiment, the network 100 is a payment network, which includes two global hubs 102, 104, a regional hub 106, and a regional branch 108. Each of the global hubs 102, 104, regional hub 106, and regional branch 108 are connected to at least two networks. In this embodiment, the two networks include a private Multi-Protocol Label Switching (MPLS) network 110 and the Internet network 112. In this exemplary embodiment, the regional branch 108 and hubs 102, 104, 106 communicate with each other over the networks 110, 112 to execute operations of, or provide services from, the payment network 100. For instance, the regional branch 108 may connect with the regional hub 106 in order to provide data to the hub 106 or to make use of services provided by the hub 106. In general, certain services, or even a majority of services, requested by a regional branch (e.g., regional branch 108, etc.) are handled by a regional hub (e.g., regional hub 106, etc.) with which that branch is associated.

In the exemplary payment network 100, the global hubs 102, 104, regional hub 106, and regional branch 108 are organized generally in a hierarchical manner, in that the regional branch 108 is disposed to primarily interact with the regional hub 106 (rather than the global hubs 102, 104). The regional hub 106 is then able to interact with the global hubs 102, 104, as necessary.

While FIG. 1 shows only a single regional branch 108, a single regional hub 106, and two global hubs 102, 104 for purposes of illustration, it should be understood that a payment network embodiment will often include additional regional hubs and regional branches. For instance, a payment network may include only one or two global hubs, five to fifteen regional hubs spread out geographically throughout the area covered by the payment network (e.g. globally, throughout a country, etc.) (i.e., generally, one per region, etc.), and numerous regional branches (i.e. 50-100 or more or less) (i.e., multiple regional branches per regional hub, etc.). Each regional branch primarily interacts with the regional hub with which it is associated geographically (i.e., in the same region, etc.). It should be understood that the organization of hubs and branches may be based on other factors than geography depending on the coverage, service offerings, and/or requirements of the payment network, generally.

In the illustrated embodiment, the regional branch 108 includes multiple routers 120 and/or additional network infrastructures for connection to the one or more private or public networks. For example, the regional branch 108 includes two routers: one router 120a connected to the private MPLS network 110 and the other router 120b connected to the Internet network 112. Further, regional branch 108 may interact with third parties (e.g., partners, customers, etc.) (not shown) that wish to make use of the payment network 100. The third parties may include financial institutions (e.g., banks, issuers, acquirers, etc.) or associated institutions, which function as issuers of payment accounts, service providers (e.g., authentication agents, rewards agents, settlement agents, etc.) and/or any other entity which uses or relies on data transfers from the payment network 100 (broadly, payment network services) etc. In one or more embodiments, one or more merchants may further be a customer to payment network 100, potentially depending on, for example, its size, volume of transactions, and/or other interactions with the payment network, etc.

With continued reference to FIG. 1, the regional hub 106 also includes two routers 120c and 120d, which are connected to the private MPLS network 110 and Internet network 112, respectively. It should be understood that regional hub 106 may include additional and/or different network infrastructures (e.g. network switches, etc.) while still comporting with the description herein. For instance, the regional hub 106 may include additional routers, per additional network connections, or potentially to ensure connection redundancy. The regional hub 106 may also include other infrastructures, such as one or more data storage locations (e.g., a data center, or part thereof, etc.), which may include data structures for storing data pertaining to the payment network 100 (e.g. transaction data, customer preference data, rewards data, services data, etc.). In one or more embodiments, the router 120c acts as an "edge" router (representing an entry/exit point of the network, for instance, for one or more third parties) for the payment network 100. The regional hub 106 further, although not shown, may include (or be co-located with) one or more data storage locations (e.g., data center(s), or parts thereof, etc.) and one or more additional networking devices (e.g., switches, etc.), interconnected between the routers 120 and the storage location(s).

As used herein, the services offered through the regional hub 106, and more generally, the payment network 100, may include, for example, payment transactions (e.g., authorizations, clearings, settlements, etc.), file transfer applications/services, mobile application support, operations, interactive (e.g., HTTP, etc.) offerings, management, video applications/services, voice applications/services, etc. The service may provide for access to the regional branch 108, the regional hub 106, or even the global hubs 102 and/or 104, depending on the content of the services offered.

As shown in FIG. 1, the global hubs 102 and 104 each include two routers 120, which are connected to the private MPLS network 110 and Internet network 112, respectively. It should be understood that global hubs 102 and 104 may include additional and/or different network infrastructures while still comporting with the description herein. For instance, global hub 102 may include additional routers, per additional network connections, or potentially to ensure connection redundancy. The global hubs 102 and 104 may also include other infrastructures, such as one or more data storage locations (e.g., a data center, or part thereof, etc.), as described above. In one or more embodiments, the global hubs 102 and 104 may include two or more additional routers to provide LAN access as well as back end network access to provide redundancy therebetween. The global hubs 102 and 104 may further provide services, such as web-based applications, which are the same or different than those provided by the regional hub 106 and/or backup services to provide redundancy for the regional hub 106, or which are provided in combination by the global hubs 102 and 104 and the regional hub 106. Global hubs 102 and 104 may also share a separate private hub network 124 apart from the MPLS network 110 and the Internet 112.

In this exemplary embodiment, the MPLS network 110 and Internet network 112 operate, in parallel, as redundant networks in the payment network 100. The MPLS network 110 operates as the primary network and the Internet network 112 is used as a backup network. Data traffic, in this embodiment, therefore, is preferably routed over the MPLS network 110 if possible, and further over the Internet network 112 when necessary for performance reasons, etc. For instance, if the MPLS network 110 is not available to the branch 108, yet the regional branch 108 is attempting to reach the global hub 102, the regional branch 108 may initiate a data transfer through the Internet network 112 (i.e., a secondary path), but then jump to the MPLS network 110 at the regional hub 106, when the data arrives at the regional hub 106 and the MPLS network 110 is available to the regional hub 106. Alternatively, if the regional branch 108 is attempting a data transfer to the global hub 104 and the MPLS network connection to global hub 104 is not available, the regional branch 108 may transfer the data to the regional hub 106 via the MPLS network 110, and the regional hub 106 may then send the data to the global hub 104 via the Internet network 112.

In various embodiments, when communicating over a public network like the Internet network 112, the payment network 100 may employ and/or generate generic routing encapsulation (GRE) tunnels to form a Virtual Private Network (VPN) between the two routers on either side of the connection. The VPN enhances the security of the data transfer, even though the data is being transferred over one or more public networks. Moreover, the hubs 106 and branches 108 in the payment network 100 may maintain GRE tunnels to other hubs and/or branches (not shown) as necessary to enhance secure communications. It should further be understood that, while the payment network 100 makes use of an MPLS network 110 as the preferred private network, or the Internet network 112 as a secondary network, another payment network embodiment may make use of other networks (e.g., two MPLS networks, etc.) while still comporting with the description provided herein.

Again, as used herein, the traffic in the network 100 (i.e., data transfers) may be provided to support, for example, payment transactions (e.g., authorizations, clearings, settlements, etc.), file transfer applications/services, mobile application support, operations, interactive (e.g., HTTP, etc.) offerings, management, video applications/services, voice applications/services, and/or other services described or suggested herein, etc. It should be appreciated that any different kind of data transfers may be affected within network 100, whether related or unrelated to payment transactions, applications and/or services, etc. More generally, in various embodiments, the network 100 may be unrelated to a payment network, or payment transactions.

Figure 2:
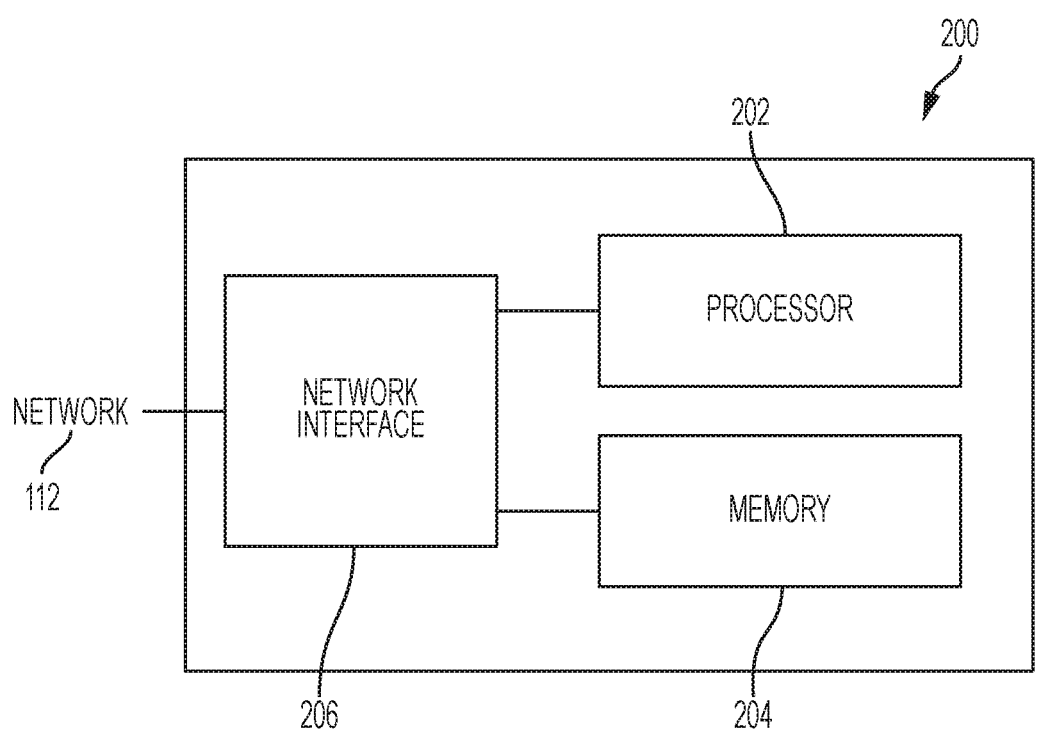
FIG. 2 is a block diagram of a computing device that may be used in the exemplary system of FIG. 1.

FIG. 2 illustrates an exemplary computing device 200 that can be used in the payment network 100. The computing device 200 may include, for example, one or more servers, routers (e.g., switches, hubs, bridges, content delivery devices, compression devices, firewalls, or other networking devices, etc.), etc. In addition, the computing device 200 may include a single computing device, or it may include multiple computing devices located in close proximity or distributed over a geographic region, so long as the computing devices are specifically configured to operate as described herein. In addition, different components and/or arrangements of components may be used in other computing devices. In the exemplary embodiment of FIG. 1, each of the routers 120 should be understood to be consistent with the computing device 200. The network 100, and its parts, however, should not be considered to be limited to the computing device 200, as different computing devices, and/or arrangements of computing devices may be used in other embodiments.

As shown in FIG. 2, the exemplary computing device 200 generally includes a processor 202, and a memory 204 coupled to (an in communication with) the processor 202. The processor 202 may include, without limitation, a central processing unit (CPU), a microprocessor, a microcontroller, a programmable gate array, an application-specific integrated circuit (ASIC), a logic device, or the like. The processor 202 may be a single core processor, a multi-core processor, and/or multiple processors distributed within the computing device 200.

The memory 204 is a computer readable media, which includes, without limitation, random access memory (RAM), a solid state disk, a hard disk, compact disc read only memory (CD-ROM), erasable programmable read only memory (EPROM), tape, flash drive, and/or any other type of volatile or nonvolatile physical or tangible computer-readable media. Memory 204 may be configured to store, without limitation, routing protocols, classifications of applications/services, rules, thresholds, and/or other types of data suitable for use as described herein. Furthermore, in various embodiments, computer-executable instructions may be stored in the memory 204 for execution by the processor 202 to cause the processor 202 to perform one or more of the operations described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

The computing device 200 further includes a network interface 206 coupled to (and in communication with) the processor 202, which permits communication with the various other components included in the network 100. The network interface 206 generally includes one or more wired network adapters, suitable for use as described herein, but may also include one or more wireless network adapters, or other devices capable of communicating to one or more of the same or different networks.

With further reference to FIG. 1, the regional branch 108 includes a routing engine 122, which in this embodiment, is a router (consistent with computing device 200). In numerous embodiments, the routing engine 122 may not be a separate router (as shown in FIG. 1), but, as indicated by the dotted line, may be included and/or embedded in one of the routers 120 (e.g., one or both of routers 120a-b, etc.) and/or other components of the regional branches 108 or hubs 102, 104, 106 connected to the network 100. The routing engine 122, whether as a standalone router or otherwise implemented in other routers and/or other devices or embedded in other devices such as a router, performs substantially consistent with the description herein. For ease of reference, however, the description is presented with reference to routing engine 122.

The routing engine 122 is specifically configured, by executable instructions, to perform one or more of the operations herein. In several embodiments, the routing engine 122 may be further configured to execute on a router using the router's command line interface (CLI), graphical user interface (GUI), etc.

The routing engine 122 is configured to coordinate traffic along different paths between the respective hubs 102, 104, and 106 and regional branch 108. In the network 100, as shown in FIG. 1, paths 114 and 116 are provided between the regional branch 108 and the regional hub 106. Likewise, as shown in FIG. 1, path 118 is provided between the customer regional branch 108 and the global hub 104. The routing engine 122 is configured to use one or more parameters and/or rules to route the traffic from regional branch 108 to hubs 104 and 106, for example, along either path 116 through the Internet network 112 or path 118 through the MPLS network 110. In particular, the routing engine 122 is configured to determine a preferred path, in part, based on published specificity values. The routing engine 122 is configured to then select and/or switch between different paths 114, 116, and 118 for the transfer of data between branch 108 and hubs 104 and 106, for example, based on the preferred path, etc. It should be understood that routing engine 122 may also be configured for use by a regional hub to determine preferred paths of communication to a global hub, regional branch, and/or another regional hub and by a global hub to determine preferred paths of communication to a regional hub, regional branch, and/or another global hub.

In the embodiment of FIG. 1, the routing information, including parameters and/or rules, are stored in memory (e.g., memory 204, etc.) in the routing engine 122, at the regional branch 108. Further, the hubs 102, 104, 106 may also include memory storing routing information. The routing parameters and/or rules are programmed into the routers by a network administrator, manager, or the like. The routing parameters and/or rules may be used by the routers to determine priority for different paths through the payment network 100. For instance, paths 114, 116, and 118 have different priorities, according to the routing information of the routing engine 122 at branch 108. The path priorities may also be determined by information published by routers connected to the MPLS network 110 and/or the Internet network 112. The routing engine 122 may use information received from other routers in combination with the routing information stored on the memory (e.g., memory 204) in the routing engine 122 to determine path priorities and/or preferences. Routers 120 include routing table data structures that are used to store routing information, such as prioritized and/or preferred paths for routing data. The routing engine 122 is configured to record up-to-date prioritized and/or preferred paths for routing data from the routers 120 to the routing tables of the routers 120 as they are determined.

In many embodiments, the routing of data transfers in the network 100 is accomplished via border gateway protocol (BGP). BGP includes a protocol for exchanging routing information between gateway hubs (e.g., global hubs 102, 104, regional hub 106, regional branch 108, etc.) (each with its own router (e.g., router 120, etc.)) in one or more networks (e.g., the payment network 100, etc.). Routers using BGP include one or more routing tables that contain a list of known routers (e.g., routers 120, etc.), the addresses they can reach, and a cost metric (broadly, specificity) associated with the path to each router 120 so that the best, preferred, or desired available path is chosen. In a BGP network, such as the payment network 100 (at least in part), routers 120 are configured to maintain up-to-date routing tables by, for example, one or more of the routers 120 sending out updated tables when a change to the routing table is detected.

Further, BGP may also be used within sub-networks of a system (e.g., one or more networks included within the global hubs 102 and/or 104). This is referred to herein as internal BGP (IBGP). BGP used between systems in a network (such as between the router 120*a* of regional branch 108 and the router 120*c* of regional hub 106) is referred to herein as external BGP (EBGP). Updates to a routing table in an IBGP network (e.g., the payment network 100, etc.) may result in sharing of the updated routing table throughout the sub-networks, while updates to a routing table in an EBGP system may result in sharing of the updated routing table to all the peer routers (e.g., the routers 120 that connect to the MPLS network 110, the routers 120 that connect to the Internet 112, etc.) of the network, as well as the routers of internal sub-networks (not shown). In some embodiments, routes between routers may be chosen based on how the routes are learned or shared between routers. For instance, a route learned via EBGP may be preferred over a route learned via IBGP. In alternative embodiments, routes learned via IBGP may be given preference. Additionally, various routers within a hub (e.g., regional hub 106, etc.) may use an Enhanced Interior Gateway Routing Protocol (EIGRP) for communications.

In the embodiment of FIG. 1, the routing engine 122 and/or routers 120 are configured to rely on a specificity value of the destination network prefix to determine the data transfer path. Specificity, as used herein, indicates how many possible unique Internet Protocol (IP) addresses are within the destination router's IP address range. Each router 120 in the payment network 100 is assigned a network address summary (or NAS) including a "mask" which indicates an IP address range or the group of IP addresses that can possibly be accessed by going through the router. For instance, global hub 102 may offer access to many different IP addresses because it is at the top of a hierarchy. However, because it offers access to so many different IP addresses, the network address summary of the global hub 102 likely has low specificity. On the other hand, regional branch 108 is positioned at the bottom of that hierarchy and offers access to few IP addresses relative to the global hub 102. Therefore, the regional branch 108 may have a network address summary with high specificity.

In the particular exemplary embodiment of FIG. 1, the router 120*a* is configured to publish a network address summary of 172.14.1.0/24 to the MPLS network 110. The first portion of the network address summary shows that the IP address range of the router includes addresses in the range of 172.14.1.0. The second portion, "24", indicates that the specificity of the network address summary is 24 bits, meaning that the most significant 24 bits (i.e., conventionally, the most significant bits in a network address are the left-most bits of the address that have the greatest values) of the IP addresses accessible through the router are the same as the network address summary. Assuming that the IP addresses are 32 bits long (as in this example), the eight least significant bits (i.e., conventionally, the least significant bits in a network address are the right-most bits of the address that have the least values) remain to make up a plurality of unique IP addresses. Therefore, the router 120*a* of the regional branch 108, for example, may only offer access to up to 256 unique IP addresses. In some embodiments, a network address summary may further include a community value for use in identifying the origin of the network address summary. The router 120, for example, that provides the network address summary may include different community values on the network address summaries to the primary network than on network address summaries to the secondary network. For instance, router 120*a* of regional branch 108 may be configured to publish a network address summary including a community value of 111 on the MPLS network 110 while router 120*b* of regional branch 108 may be configured to publish a network address summary including a community value of 222 on the Internet network 112. The use of community values provides an additional method of steering traffic through the system.

In one additional example, the router 120*g* publishes a network address summary of 172.16.0.0/12. This means that the network address summary of router 120*g* has only 12 bits of specificity. As a result, the more specific addresses already discussed fall within the less specific "mask" of router 120*g*.

In the exemplary embodiment of FIG. 1, the routing engine 122 is configured to, when determining a preferred path for data transfer, prioritize the destination router with the highest specificity. A higher specificity indicates that the route to the destination of the data through the high specificity router is a preferred route and for a specific predetermined reason likely take fewer "hops" (transfers between network locations) to get there. For instance, if the destination of a data transfer is within the IP address range of the router 120*a*, it is likely that, if the data is sent to router 120*a*, it will promptly be sent on the destination, which is one of, at maximum, 256 possible destinations. As compared to, if the data is sent to the router 120*g* of the global hub 104, it is likely that the data will need to be transferred several more times down a hierarchy of routers or other network topologies, that is, less promptly. By prioritizing higher specificity, a router (e.g., routers 120*a*-*h*, etc.), which implements a routing engine (e.g., routing engine 122, etc.), is able to take a preferred route, reduce and/or minimize a number of transfers necessary for the data to arrive at the destination.

Moreover, the payment network 100 is also configured to prioritize data transfers on the primary MPLS network 110 over similar transfers on the secondary Internet network 112. In order to enforce this preference, routers 120 that connect through the Internet network 112 may be configured (e.g., a router may include a macro that performs actions based on the router's specific network prefix, etc.) to include a prepend value in the network address summary (specifically, for example, by adding, or prepending, a BGP Autonomous System Number (AS) to the route, network, or network prefix) that is interpreted as decreasing the specificity value, or reducing the preference value, of the network address summary. For example, the router 120*b* of regional branch 108 publishes a network address summary of 172.14.1.0/24 with a prepend value (BGP AS) of +3, indicating that the specificity, or the preference value, of the route, is decreased by 3 when determining priority for data transfer. Decreasing the specificity for routers connected to the secondary Internet network 112 essentially makes the path through that router 120*b* appear worse to the routing engine 122 and, therefore, lowers the priority of that path. Similarly, router 120*d* may publish a network address summary of 172.14.0.0/16 with AS Prepend+3, and router 120*h* has a specificity of 12 with AS Prepend+3, each having a consistent specificity as understood by the routing engine 122. It should be understood that the specific value of the prepend may be otherwise in different payment network embodiments, based on, for example, a topology and/or size of the payment network 100, a number of networking devices included in the payment network 100, a number of autonomous systems included in a path, local preferences, whether a route is learned in IBGP or EBGP, and/or a type and/or number of network included therein (e.g., two MPLS networks, etc.), etc.

In the exemplary embodiment of FIG. 1, the global hub 102 is configured to act in a backup hub role to the global hub 104, and therefore, the specificities of routers 120e and 120f have been decreased (172.16.0.0/12 with AS Prepend+1 and 172.16.0.0/12 with AS Prepend+4, respectively) in comparison to the specificities of routers 120g and 120h (172.16.0.0/12 with no AS Prepend and 172.16.0.0/12 with AS Prepend+3, respectively). As a result, in this exemplary embodiment, data transfers to global hubs 102 and 104 are generally prioritized to go to global hub 104 over global hub 102. For instance, a routing engine or router may first compare the specificity values of two possible routes (e.g., the route to router 120e has a specificity value of 12 and the route to router 120g also has a specificity value of 12, etc.) and, if they are the same, then compare the AS prepend values for the two possible routes (e.g., the route of router 120e has an AS prepend value of +1 and the route to router 120g has no AS prepend value, or an AS prepend value of 0, etc.). If, in comparing two routes, the specificity values of the routers are different (e.g., the path to router 120g has a specificity value of 12 while the path to the router 120c has a specificity value of 16, etc.), any AS prepend values may be ignored and the route with the higher specificity value may be selected.

Figure 3:
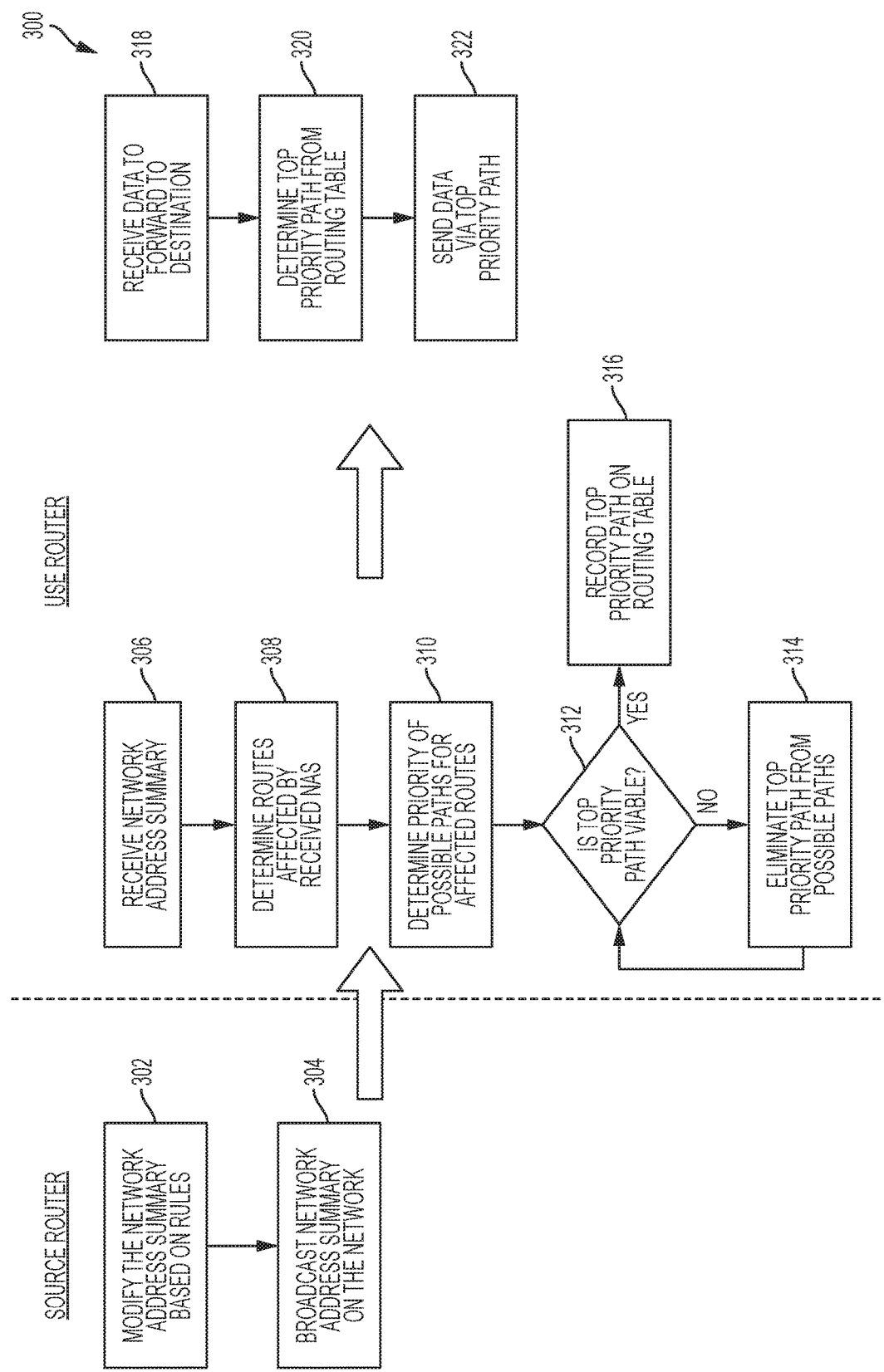
FIG. 3 is an exemplary method of determining and recording paths for transfers of data by prioritizing paths, and which may be suitable for use in the payment network of FIG. 1.

FIG. 3 illustrates an exemplary method 300 for determining and recording preferred routes for data transfers between regional hubs and/or regional branches within a payment network. The exemplary method 300 is described as implemented in the payment network 100, and specifically, the routing engine 122 (as a standalone device, or as incorporated/integrated in routers 120). However, it should be understood that the method 300 is not limited to the routing engine 122, as the method 300 may be implemented in other ones of the computing devices 200 in the payment network 100, or in multiple other computing devices. In addition, the methods herein should not be understood to be limited to the exemplary payment network 100 or the exemplary computing device 200, and likewise, the payment networks and the computing devices herein should not be understood to be limited to the exemplary method 300.

At 302, a source router (e.g., routers 120a-h, etc.) in the payment network 100 modifies a network address summary associated with the router based on rules. The modification of the network address summary may include adding or amending a prepend value of the network address summary, such as the AS prepend, described above. Alternatively or additionally, the address, specificity value, and/or the community value of the network address summary may be modified.

The rules to modify the network address summary may be defined by a network administrator and may be triggered by events detectable by the router or by user input. For instance, as described herein, a prepend value may be added to the network address summary based on the type of network to which the router is connected.

At 304, the source router broadcasts the modified network address summary on the network. Other peer routers and/or routing engines in the network receive the network address summary from the router and update the routing tables as described below.

At 306, the routing engine 122, on a use router, receives a network address summary for the source router (e.g., routers 120a-h, etc.) in the payment network 100. A received network address summary may be an updated summary from a router already known to the routing engine 122 or a new summary from a previously unknown router. The new or updated network address summary is often received based on the occurrence of an event within or associated with the payment network 100, such as, for example, network address summary updates from a peer router 120 (or other router), notifications from one or more routers 120 that a router in the payment network 100 is disabled, etc. Additionally, or alternatively, network address summaries may be updated at a regular or irregular interval (or otherwise) (e.g., as part of network maintenance, etc.), a routing table being updated at a regular or irregular interval (or otherwise), and/or in response to one or more data transfer requests.

Upon receipt of the network address summary, the routing engine 122 determines, at 308, the routes in the routing table that are affected by the new or updated network address summary. For example, as shown in FIG. 1, the routing engine 122 may receive a new or updated network address summary that affects paths 114, 116, and/or 118. For instance, the routing engine 122 may be notified that router 120c is disabled (e.g., via an update from a peer router associated with the MPLS network 110, for example, indicating a path is gone, etc.), which may affect the route for data transfer between the regional branch 108 and the regional hub 106 (e.g., the network prefix is withdrawn, etc.).

With continued reference to FIG. 3, at 310, the routing engine 122 then determines priorities of possible paths for the affected routes based on the network address summaries of the involved routers, including the new and/or updated network address summary. Priority or preference metrics of the network address summaries are compared and the paths associated with the network address summaries are organized in a priority order accordingly. For instance, if a newly received network address summary indicates, based on preference metrics, that the associated path is preferred over all other paths on the route, the associated path will be assigned the top priority. Alternatively, the metrics of the newly received network address summary may indicate that the associated path is not preferred over any of the other paths on the route, resulting in the new path being assigned last priority. The metrics of the received network address summary may also result in the associated path being assigned an intermediate priority with respect to other paths on the route.

Generally, a path is preferred over other paths if the preference metrics indicate that the path is faster and/or more efficient. However, paths may also be prioritized based on other metrics, such as reliability or security. The network address summaries may include specificity information that routers 120 have previously published on the networks 110 and 112, as described above, which may be used as an indicator of a likely speed and/or efficiency of the associated path and can commonly be controlled by the use of common values. Additionally, the network address summaries may include AS prepends that modify the specificity values.

In the embodiment of FIG. 1, for example, the routing engine 122 determines that path 114 is the highest priority path (as compared to path 116) to get to regional hub 106. More specifically, for example, the path 114 routes through the primary MPLS network 110 to router 120c, which publishes a network address summary of 172.14.0.0/16, while path 116 routes through the Internet network 112 to router 120d, which publishes a network address summary of 172.14.0.0/16 with an AS Prepend+3. Both path 114 and path 116 have the same specificity value of 16, but the specificity value of path 116 is adjusted by a prepend value, by the routing engine 122, because path 116 connects through the secondary Internet network 112 rather than the primary MPLS network 110. As a result, the specificity value of path 116 is interpreted by the routing engine 122 as being less than the specificity value of path 114 and, therefore, path 114 is promoted to a higher priority than path 116. But for the prepend value published with the network address summary of router 120d for path 116, path 114 and path 116 would have had the same specificity values and routing between the paths would have been defined by other techniques (e.g., load balancing, etc.), whereby data may be routed via Internet network 112 despite the availability of MPLS network 110. Therefore, in this example, the prepend value acts to control the path that the data is transferred upon. As described above, higher specificity values are prioritized because routing directly to higher specificity routers reduces the distance, or number of "hops" necessary to complete the data transfer.

In addition in FIG. 1, path 114 is compared against path 118 to router 120g of the global hub 104 (the global hub 104 acts as a backup in the event that regional hub 106 is unreachable). The network address summary of router 120g is 172.16.0.0/12, including a specificity value, or "mask" of 12. The routing engine 122 compares the specificity value of 12 for path 118 with the specificity value of 16 for path 114 and determines that path 114 is a higher priority than path 118.

Referring again to FIG. 3, after determining priorities of possible paths for data transfer, the routing engine 122 checks the top priority path, path 114, for viability, at 312.

Specifically, in the above example, if path 114 fails the check at 312, the routing engine 122 eliminates path 114 from the prioritized possible paths to be selected, at 314 (while potentially retaining the path 114 in a separate database of potential paths). Because path 114 is eliminated as an option (in the routing table), the top priority path becomes path 116, which is then checked for viability, at 312. Path 116 has the second highest priority, as the specificity value is 16 with an AS prepend modifier of 3, which is lower specificity than path 114, but still higher than the specificity of path 118 to global hub 104, which has a specificity value of 12. If the check at 312 succeeds, path 116 is added (e.g., recorded, saved, etc.) to the routing table as the preferred path for data from regional branch 108 to regional hub 106, at 316. In this manner, the routing engine 122 loops through the possible paths in a prioritized order such that the path that is saved to the routing table is the currently viable path with the highest specificity. Often, only viable, top priority paths are added to the routing table, while the remaining paths are stored in a separate database for future route comparisons.

Optionally, the routing engine 122 may check the viability of path 118. If path 118 is recorded in the routing table and data is sent over path 118 to the global hub 104, the global hub 104 may then attempt to complete the transfer to regional hub 106 through an alternate path. Alternatively, the global hub 104 may behave as the regional hub 106 in response to the data transfer. If the data transfer included a request for return data or execution of a hub service, the global hub 104 may return the requested data or provide the hub service, if possible. Additionally, the routing engine 122 may check paths to the router 120h of global hub 104 through the Internet network 112 or to routers 120e and 120f of global hub 102 through one of the networks 110 and 112. The order of these checks would be prioritized as described above, according to the specificity of the path to the destination router at the regional branch 108.

The routing engine 122 may determine a preferred path, as described above, for each route affected by any newly received or updated network address summaries. Each determined preferred path is recorded in the routing table for use during data transfer.

In some embodiments, a routing engine at the regional hub 106 may perform certain of the operations described above with reference to method 300, as desired or as necessary, to determine preferred paths, send data transfers, and/or forward data transfers received from other hubs and branches. Likewise, the global hubs 102 and 104 may also employ similar (or the same) operations in routing data to other parts of the payment network 100.

With further reference to FIG. 3, after the routing table is updated, the routing engine 122 receives data, at 318, to be forwarded to the regional hub 106, for example, a destination of the data. The routing engine 122 then determines a priority path, at 320, based on the routing table. In the above example associated with FIG. 1, because path 114 does not have a prepend value and path 116 has a prepend value of 3, path 114 is preferred. As such, path 114 would be recorded on the routing table at 316. In this example, the routing engine, at 320, would then determine the path 114 to be preferred from the routing table. The routing engine 122 then sends, at 322, the received data to the destination via the determined priority path. It should be appreciated that the router may rely on further information in routing the data traffic in one or more other embodiments.

In various embodiments, payment networks and methods described herein employ one or more routing engines with two or more redundant networks using the routing strategy described to handle data transfers within global payment networks. Consequently, data transfers within the payment network are routed through paths that are more efficient or modified to be understood by conventional routing techniques as more efficient (e.g., by modifying prepends and/or assigning particular addressing), whereby the payment network is able to define certain paths are preferred. Yet, despite influencing on the routing techniques to promote certain paths over other paths, the routing described herein permits other factors to be considered in routing data transfers.

It should be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by: (a) determining a subset of network routers that offer access to the regional hub based on network address summaries for the first and second routers; (b) prioritizing the first router over the second router, based on a specificity value of each of the first and second routers, as defined by the network address summaries; (c) checking whether a connection to the first router provides a viable data transfer path to the regional hub; (d) recording the path to the first router in a routing table, when the connection to the first router is viable; (e) receiving a request to transfer data to the regional hub; and (f) transferring the data, via the path recorded in the routing table, to the regional hub.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments disclosed herein may provide all or none of the above mentioned advantages and improvements, and still fall within the scope of the present disclosure.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A payment network for routing data transfers between one or more regional hubs and/or branches, the payment network comprising:

a regional hub including a first router coupled to a first network and a second router coupled to a second network;

wherein the first router is configured to broadcast a first network address summary having a specificity value and an autonomous system (AS) prepend on the payment network, the specificity value of the first network address summary indicating a number of addresses of destinations accessible through routers that include a matching set of most significant bits as the first router;

wherein the second router is configured to:
modify a specificity value and/or an AS prepend of a second network address summary based on the second network, the specificity value of the second network address summary indicating a number of addresses of destinations accessible through routers that include a matching set of most significant bits as the second router, thereby reducing a priority of the second router; and
broadcast the modified second network address summary on the payment network; and a regional branch including a third router coupled to the first network and a fourth router coupled to the second network, the regional branch including a routing table and a routing engine, the routing table including routing path information, the routing engine configured to:
receive the first network address summary and the second network address summary;
prioritize the first router over the second router, based on the specificity values and the AS prepends of the first and second network address summaries;
check whether a connection to the first router provides a viable data transfer path to the regional hub; and
record the path to the first router in the routing table, when the connection to the first router is viable, whereby priority of the paths is managed based on selection of one path over another path.

2. The payment network of claim 1, wherein the first network is a Multi-Protocol Label Switching (MPLS) network and the second network is the Internet.

3. The payment network of claim 1, wherein the payment network routes data using border gateway protocol (BGP); and
wherein prioritizing the first router over the second router is further based on whether the paths are learned through external BGP or internal BGP.

4. The payment network of claim 1, wherein the routing engine is further configured to:
receive a request to transfer data to the regional hub; and
transfer the data, via the path recorded in the routing table, to the regional hub.

5. The payment network of claim 1, wherein the data is associated with at least one of an authorization service, a clearing service, and a settlement service.

6. A computer-implemented method for routing data on a network, the computer-implemented method comprising:
modifying, by a router at a location, preference data of a network address summary based on at least one routing rule, the preference data including a specificity value and an autonomous system (AS) prepend, the specificity value indicative of a number of most significant bits shared by addresses of multiple possible destinations to which associated routing paths lead;
broadcasting, by the router, the modified network address summary;
receiving, by a computing device at a regional branch, the modified network address summary associated with the router over a network connection and storing the modified network address summary in a router table;

accessing, by the computing device, multiple routing paths from the regional branch to the location from the routing table, one of the multiple routing paths associated with the modified network address summary, the other multiple routing paths each associated with a network address summary in the routing table including a specificity value and an AS prepend;

comparing the modified network address summary to the other network address summaries based, at least in part, on the corresponding specificity value and AS prepend;

when the specificity value of the modified network address summary is a highest specificity value or when the specificity value of the modified network address summary is a shared highest specificity value and the modified network address summary includes a lowest AS prepend, selecting, by the computing device, the one of the multiple routing paths associated with the modified network address summary as a preferred path to the location via the router; and recording the preferred path to the routing table as a priority path for services accessible to the regional branch at the location.

7. The computer-implemented method of claim 6, further comprising selecting the one of the multiple routing paths associated with the modified network address summary as a preferred path to the location via the router when the specificity value of the modified network address summary is a highest specificity value among the network address summaries in the routing table.

8. The computer-implemented method of claim 6, further comprising checking that the preferred path is viable; and
wherein the preferred path is only recorded to the routing table when the preferred path is viable.

9. The computer-implemented method of claim 8, further comprising:
eliminating the preferred path when the preferred path is not viable;
selecting a second preferred path to the location, which is associated with one of the other network address summaries when the one of the other network address summaries includes a second highest specificity value, or includes a second highest shared specificity value and the lowest AS prepend among network address summaries with the second highest shared specificity value; and
recording the second preferred path, associated with the one of the other network address summaries to the routing table.

10. The computer-implemented method of claim 9, wherein the second preferred path includes an Internet network and the preferred path includes a Multi-Protocol Label Switching (MPLS) network.

11. The computer-implemented method of claim 10, wherein preference data of the received network address summary includes a first community value indicating the MPLS network is a primary network and preference data of a network address summary associated with the second path includes a community value indicating the Internet network is a secondary network.

* * * * *